INVENTOR.
MAURICE J. ZUCROW
HERMAN L. COPLEN JR.
ATTORNEY

INVENTOR.
MAURICE J. ZUCROW
HERMAN L. COPLEN JR.
BY
*D. Gordon Angus*
ATTORNEY

United States Patent Office 2,794,318
Patented June 4, 1957

2,794,318

PROPELLANT SUPPLY SYSTEM FOR JET PROPULSION MOTOR

Maurice J. Zucrow, West Lafayette, Ind., and Herman L. Coplen, Jr., Pasadena, Calif., assignors, by mesne assignments, to Aerojet-General Corporation, Azusa, Calif., a corporation of Ohio Application August 22, 1952, Serial No. 305,872

3 Claims. (Cl. 60—35.6)

This invention relates to jet propulsion systems and more particularly to such systems in which the flow of liquid propellants is controlled.

In one known system of jet propulsion liquid propellant is supplied to the combustion chamber of a rocket motor where it is burned to produce gases under pressure which are expelled at high velocity through an exhaust nozzle to create the thrust. In some such systems two different propellants are used, for example, aniline as a fuel and red fuming nitric acid as an oxidizer, which are separately stored and forced into the motor chamber under the pressure of some inert gas source such as nitrogen. In a variation of this system, monopropellant is used, that is a liquid propellant which contains both the fuel and the oxidizer for its own combustion, and in such case this likewise has been forced into the combustion chamber of the rocket motor under the pressure of an inert gas source.

Sometimes when it is attempted to introduce the propellant at the full normal operating rate, the combustion does not start immediately, resulting in an accumulation of unburned propellant in the combustion chamber. Then when combustion does start the amount of propellant in the combustion chamber may be sufficient to cause an explosion. To avoid this, it has been proposed to provide control valves from the propellant sources which open slowly so as to create the desired buildup of combustion and thrust. Such throttling valves have the disadvantage of having relatively long travelling valve members which present a difficult stuffing-box packing problem in preventing leakage of propellants.

It would be more desirable to use a relatively quick-opening, short-travel type of valve such as a bellows stem-sealed piston valve or a burst diaphragm type valve. These are much less susceptible to leakage and operating troubles. In accordance with the present invention there is provided a system which permits the use of such desired quick-opening valves. The invention is carried out by provision of a controlled pressure regulator which regulates the pressure from the output of the pressurizing gas source, and which is controlled at a proper rate to permit the desired rate of buildup of propellant flow into the combustion chamber.

The invention will be better understood from the following detailed description and the accompanying drawing which illustrates a system according to the invention in which.

Figure 1:
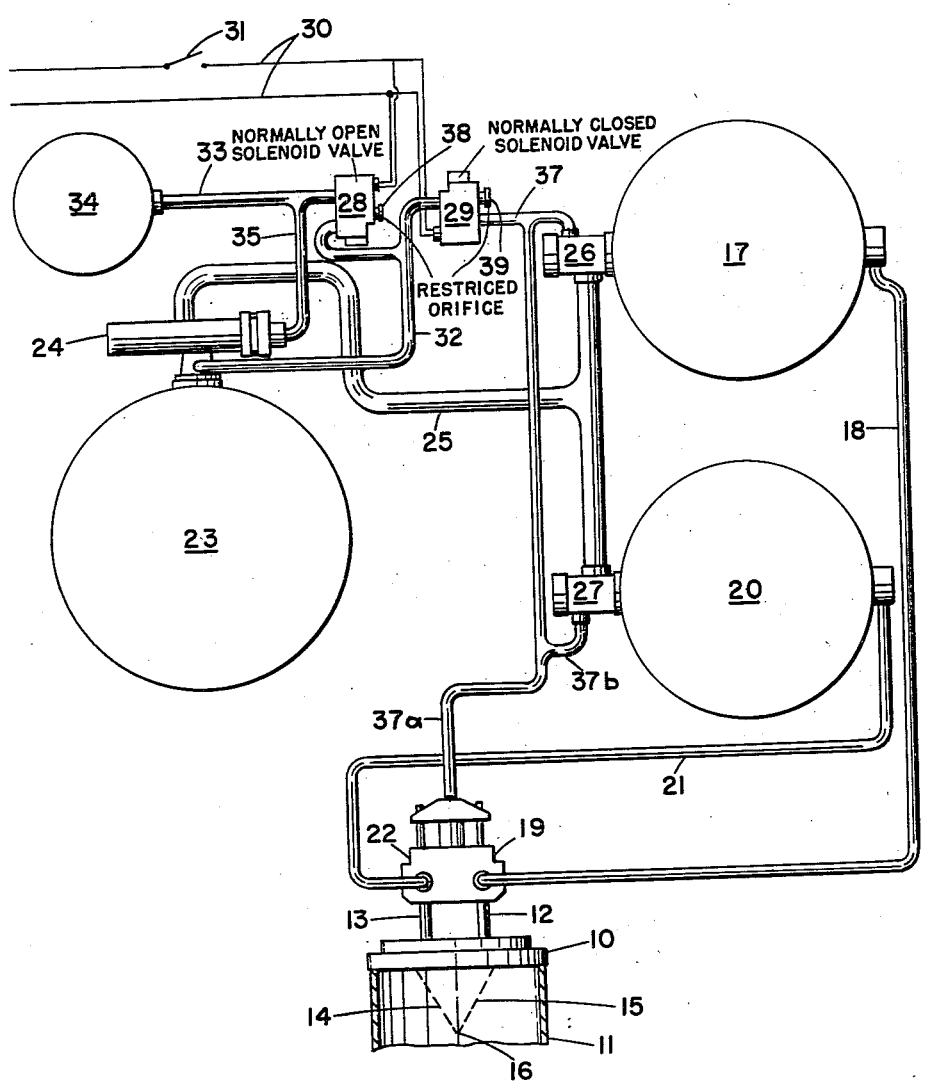
Fig. 1 is a schematic view of the propellant tanks, air tanks, motor chamber and valves.

Referring to the drawing, Fig. 1, there is shown the injector head 10 of a rocket motor of which part of the cylindrical combustion chamber 11 is shown. Leading to the injector there are two propellant flow conduits 12 and 13, one for a liquid oxidizer such as red fuming nitric acid and the other for a liquid fuel such as aniline. The dotted lines 14 and 15 indicate the flow of the propellants from the injector head showing the two streams of fluid being directed toward each other to impinge at a point 16 within the combustion chamber. It should be understood, however, that one type of injection is not restricted to impinging streams.

One propellant fluid, for example the red fuming nitric acid, is contained in a tank 17 to the outlet of which is connected a conduit 18 leading to a propellant control valve 19 which allows it to flow into conduit 12 when the control valve opens. Another tank 20 contains the other propellant fluid such as aniline, from the outlet of which is connected a conduit 21 leading to another propellant control valve 22 which when opened permits the fluid to flow into conduit 13.

For the purpose of pressurizing the propellant tanks 17 and 20 there is provided a tank 23 which may contain an inert gas such as nitrogen under pressure. There is connected at the outlet of the tank 12 a pressure regulator 24 having an outlet conduit 25 which leads to valves 26 and 27. These in turn lead into the respective propellant tanks 17 and 20.

Figure 2:
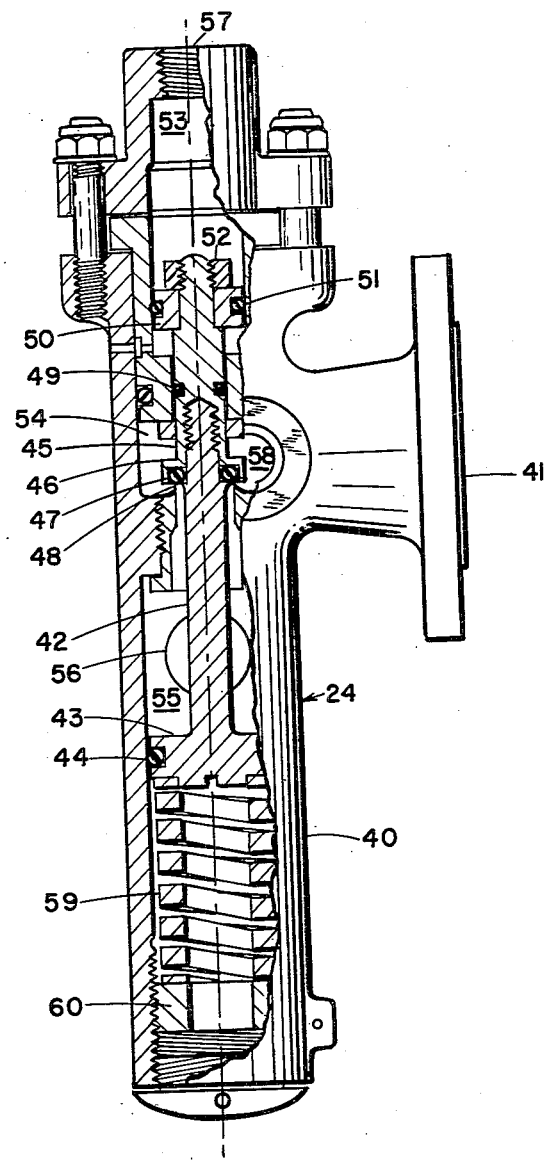
Fig. 2 is a view partially in cross section of the pressure regulator.

Constructional details of a regulator useful as the regulator 24 are illustrated in detail in Fig. 2. It is of the type having a pilot part and a main part, and it is constructed so that when the pilot part is under relatively great pressure, the control adjustment of the regulator is reduced to substantially zero and as the pressure in the pilot part decreases, the control adjustment of the regulator is increased at a regulated rate to permit increased flow from the pressure tank.

The regulator of Fig. 2 comprises a generally cylindrical housing 40 having an inlet gas port 41 arranged to lead within the housing from the pressure tank 23 of Fig. 1. Within the cylindrical part of the housing there is provided a valve rod 42 having at one end thereof a piston element 43 provided with an O-ring 44 to prevent gas leakage. At the opposite end of the rod 42 there is threaded to it a rod 45 forming a continuation thereof, the rod 45 being provided with a valve portion 46 having a soft material such as an O-ring 47 adapted to meet an annular valve seat 48. The stem of rod 45 is provided with an O-ring 49 to prevent gas leakage and at the end of the rod opposite the valve seat there is fastened a piston element 50 provided with an O-ring 51, the piston 50 being held by a suitable nut 52. The space 53 at the end of the piston 50 constitutes a pilot chamber, and the space 54 adjacent the valve seat 48 constitutes the high pressure chamber, receiving the pressure from tank 23. Chamber 55 comprises the gas outlet chamber and is provided with an outlet port 56 arranged to be coupled to conduit 25 in Fig. 1. The pilot chamber 53 has an opening 57 leading into it adapted to receive the conduit 35 of Fig. 1. At the inlet port 41 there is provided an exit opening 58 adapted to be connected to conduit 32 of Fig. 1. The piston 43 is loaded with spring 59 compressed between the piston and an adjustable nut 60 at the end of housing 40.

Figure 4:
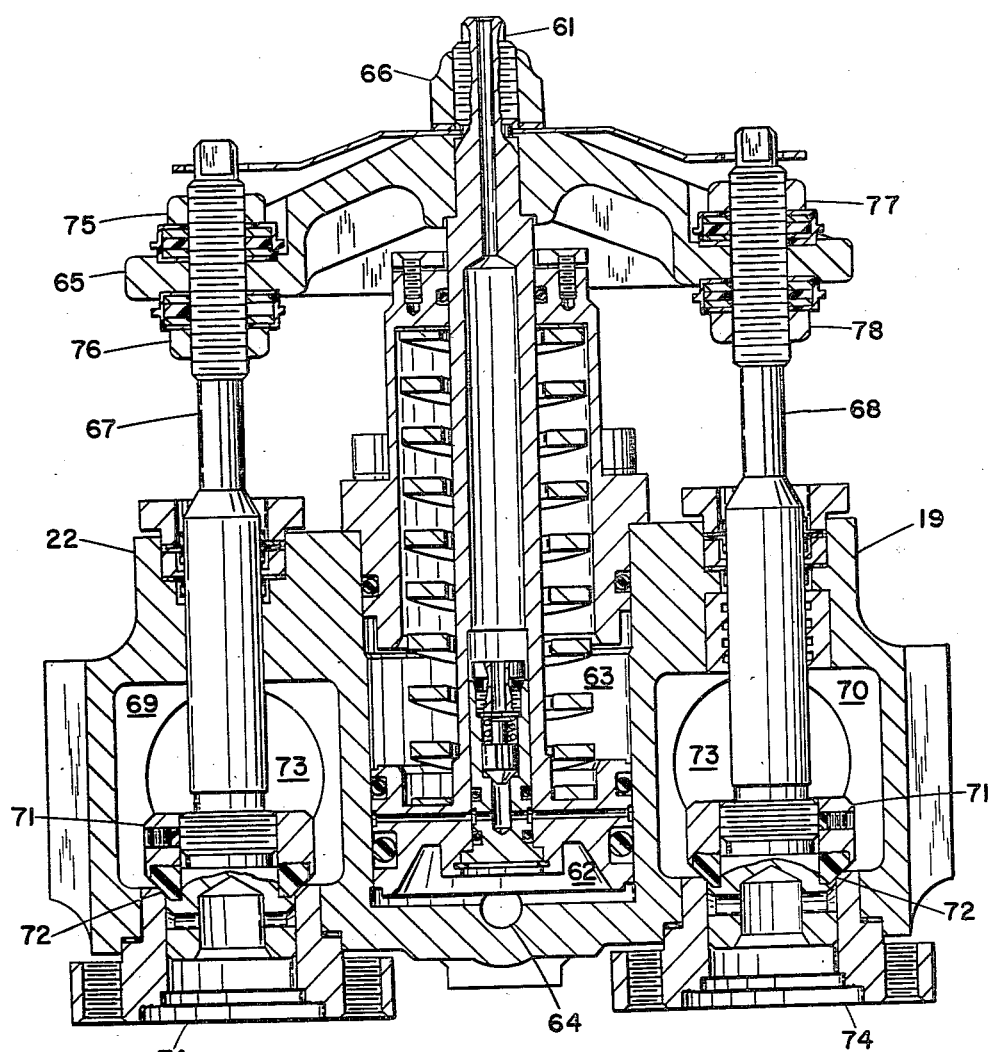
Fig. 4 is a cross section view of a combined fuel and oxidizer control valve.

The elements 19 and 22 of Fig. 1 may be quick-opening globe or piston type valve or burst diaphragm fittings may be used if desired. The valves 19 and 22 may conveniently be constructed in the form of a double piston valve with a single control as shown in Fig. 4. In this arrangement valves 19 and 22 are arranged in a single housing and provided with a single control plunger 61 so as to be operated simultaneously. The control plunger 61 carries a piston 62 which operates in a cylinder 63 into which there is a port 64 which connects with conduit 37a, Fig. 1. Pressure in conduit 37a operates in the cylinder below the piston to push the piston up in Fig. 4.

There is attached to the outer end of the plunger, a head 65 fastened to the plunger by a suitable nut and lock nut arrangement 66. This head extends from both sides of the plunger and at the respective sides it is attached to respective plungers 67 and 68 which plungers extend to respective valve housings 69 and 70. Each of the plungers 69 and 70 is provided with a valve portion 71 adapted to seat on a valve seat 72. Each of the valves is provided with an inlet port 73 for connection with the respective propellant conduits 18 and 21 of Fig. 1; and at the downstream side of the valve seat, each valve is provided with an outlet port 74, these outlet ports connecting with respective outlet conduits 12 and 13 of Fig. 1. For the purpose of adjusting the seating of the valves, there are provided adjusting nut and lock nut arrangements 75, 76, 77 and 78.

The arrangement is such that when pressure develops in conduit 37a of Fig. 1, the plunger 61 is pushed up, opening the propellant control valves 71, allowing propellant from the tanks 17 and 20, to flow through conduits 12 and 13 into the motor as shown in Fig. 1.

Figure 3:
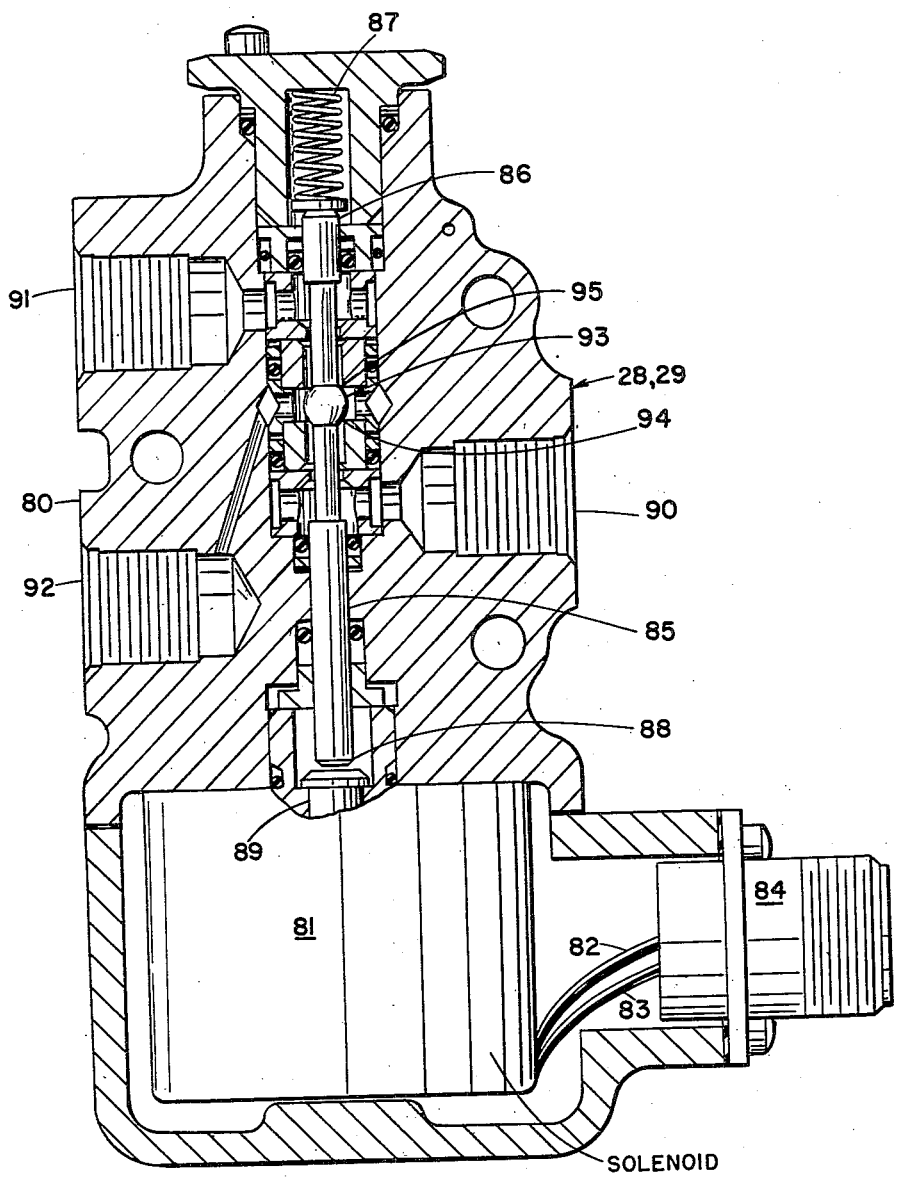
Fig. 3 is a cross section view of a solenoid valve.

To enable the system to be operated according to the invention there is provided a control means comprising a pair of solenoid operated valves 28 and 29 shown in Fig. 1. The solenoids of these valves are energized by electric lines 30 passing through a switch 31. Such a solenoid operated valve is illustrated in Fig. 3, where it is numbered 28.

The solenoid valve comprises a housing 80 containing a solenoid 81 at one end thereof from which terminal leads 82 and 83 are brought out to a receptacle 84 which is adapted to thread into a corresponding plug member (not shown), so that the leads 82 and 83 can join their respective wires 30 of the electrical line. Within the housing there is provided an axial spindle 85 that is movable in a direction colinear with the central axis of the solenoid. At one end 86 the spindle is in contact with a compression spring 87 that urges the spindle to move downward with reference to Fig. 3. The other end 88 of the spindle is adapted to engage a plunger 89 of the solenoid.

In Fig. 1 solenoid valve 28 is used as a normally open valve while solenoid valve 29 is used as a normally closed valve. Fig. 3 shows the construction common to both valves 28 and 29. The difference in performance is accomplished by the manner in which the inlet, outlet and vent ports are connected in respect to the system. In the valve 29, port 90 serves as the inlet port and is connected to the pressure conduit 32 of Fig. 1. Port 92 serves as the outlet port and is connected to conduit 37 of Fig. 1. Port 91 serves as a vent through which the gases in conduit 37 are released to the atmosphere through restrictive orifice 39.

The spindle 85 of the solenoid valve is provided with an integral ball shaped enlargement 93 which is adapted to seat against the valve seat 94 when the spindle is in one position and against the valve seat 95 when the spindle is in the opposite position. The compression spring 87 tends to keep the ball shaped enlargement 93 seated against seat 94. In valve 29 when the enlargement is in this position gas under pressure acting on the inlet port 90 is prevented from flowing into conduit 37. When the ball shaped enlargement 93 is seated against seat 95 by energizing the solenoid, the gases under pressure in the inlet port 90 are permitted to flow out through the outlet port 92 into conduits 37, 37a and 37b thereby operating valves 19, 22, 26 and 27 of Figure 1. When the solenoid 81 is de-energized, it permits the gas under pressure in conduits 37, 37a and 37b to escape through an orifice vent 39 which is threaded into port 91; venting the gas through port 91 allows valves 19, 22, 26 and 27 to close.

As stated above the valves 28 and 29 are identical in construction but are operated in the opposite manner to each other. Port 91 in valve 28 becomes the inlet port and is connected to conduit 32 and port 92 in valve 28 thereupon becomes the outlet port and is connected to conduit 33 shown in Fig. 1. Port 90 becomes the vent in valve 28 and is connected to restrictive orifice 38. Valve 28 is arranged so that when the coil 81 is de-energized the valve is open from its inlet port 91 allowing the gas in tank 23 to flow through conduit 32 into inlet port 91 and out the outlet port 92 and through conduit 33 to a volume tank 34, shown in Fig. 1, and also through conduit 35 to chamber 53 of regulator valve 24 in Fig. 2 thereby closing the valve 46 and thereby closing the regulator. When the solenoid is energized in valve 28, the outlet port 92 is shut off from pressure line 32 and the gas entering port 91 is vented through port 90 which contains a restricted orifice 38.

Figure 5:
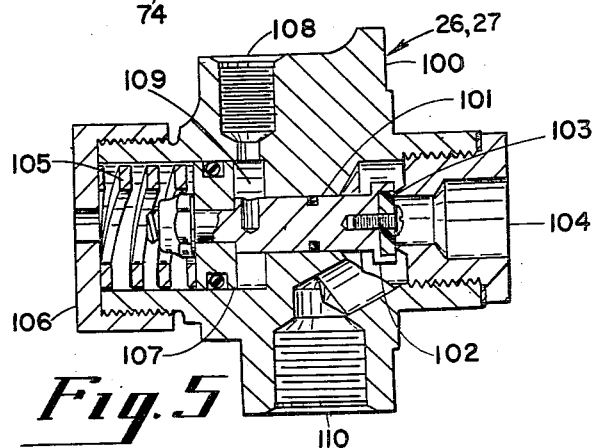
Fig. 5 is a cross section view of the valves for pressurizing the propellant tanks.

A suitable form for the valves 26 and 27 which pressurize the propellant tanks 17 and 20, is illustrated in Fig. 5. The valve housing 100 contains a spindle 101 movable in the axial direction and provided with a valve member 102 adapted to seat against an annular valve seat 103 located inside the outlet port 104 which connects with the respective propellant tank. A compression spring 105 placed between a cap 106 and the plunger 107 on the valve spindle serves to urge the valve to a closed position against the valve seat. The valve control port 108 connected with the conduits 37 and 37b of Fig. 1 applies the pressure to a chamber 109 causing plunger 107 to move to the left (with reference to Fig. 5) against the spring tension to open the valve. This provides an open path between valve inlet port 110 and the outlet port 104. The pressure conduit 25 from the output of regulator 24 is connected to port 110 and the pressure will thus be applied to the propellant tank when the valves 26 and 27 are opened.

While the system is at rest and before the switch 31 is closed, the inert gas pressure in tank 23 is at its highest value, thereby pressurizing the volume tank 34 and the pilot chamber 53 of regulator valve 24, so that this pilot pressure will close the regulator 24 to its most restricted condition so that no gas can flow from tank 23 into conduit 25, thus maintaining the pressure in conduit 25 at a low value.

When the switch 31 is closed to operate the system, the solenoids of valves 28 and 29 will be energized. This will open the solenoid valve 29 so that the inert gas under high pressure in tank 23 will be conveyed to conduits 37, 37a and 37b; and the high pressure will thereby be applied at the controls of valves 26 and 27 to open these valves allowing whatever pressure is in conduit 25 to be applied to the propellant in tanks 17 and 20. At the same time the inert gas under high pressure in conduit 37 is also applied through conduit 37a to the control of the propellant valve, thereby opening valves 19 and 22. This will allow the initial low pressure of conduit 25 to cause propellant to flow through the conduits 18 and 21 through the valves 19 and 22, conduits 12 and 13 and thence into the injector head 10.

Now at the same time that solenoid valve 29 was operated, the solenoid 28 was operated. The operation of valve 28 has the effect of cutting off the high pressure of conduit 32 from conduit 33 and of opening the conduit 33 to the vent 38. As the vent is adjusted for a desired degree of regulated flow, the gas in the volume chamber 34 gradually flows out of vent 38 with a gradually reducing pressure in conduits 33 and 35 and in the pilot chamber 53 of valve 24. As the pressure reduces in the pilot chamber, the regulator 24 gradually opens to a wider position allowing greater flow from pressure tank 23. This gradually raises the pressure in conduit 25, thereby increasing the pressure on the propellant in tanks 17 and 20 with attendant increasing rate of flow into the combustion chamber 11.

When the venting of conduit 33 has been completed, the pressure applied to the propellant tanks will be up to the full value for which the regulator is set and the rocket motor will be running normally.

When aniline and fuming nitric acid are used as the two propellants spontaneous combustion occurs almost immediately upon their mutual impingement within the motor chamber. A short delay in the occurrence of the combustion after the propellants first enter the chamber will not be serious with the present system because the propellants enter slowly at first. The increased rate of propellant flow will not occur until after combustion has started. This operation will prevent undesired large quantities of the propellant to accumulate in the motor before combustion, which accumulations might cause an explosion when combustion does occur.

Although a system using two fluids such as aniline and fuming nitric acid has been described and illustrated, it should be understood that the system is actually applicable for use with either a single or several fluid. Single fluid propellants, commonly known as monopropellants have been used in rocket motor operations, a typical example being nitromethane which carries in the single fluid source both the fuel and the oxidizer required for its combustion. Such a single fluid system would be similar to that illustrated in the drawing, except one of the tanks 17 or 20 would not be used; and likewise the conduit system and injector means associated with it would not be used.

It will be recognized that by the present invention there is provided an effective means for introducing a liquid into a container or chamber under pressure at a controllable rate of increase in flow rate, beginning at a low rate and increasing up to a desired high rate of flow. The invention should not be construed to be limited except in accordance with the scope of the appended claims.

We claim:

1. A system for introducing a liquid propellant into a motor chamber, said system comprising a source of the propellant, conduit means from the source to the chamber, a pressure tank, conduit means between the pressure tank and the propellant source, a pressure regulator in the last-mentioned conduit means, said pressure regulator comprising a piston and a valve on the piston, said valve being located in the path of flow through said last-mentioned conduit means, a spring connected with said piston urging the piston in the direction which opens said valve, and a pilot chamber in communication with said piston, the pressure in said pilot chamber urging the piston in the direction which closes said valve, whereby decreasing pressure in the pilot chamber produces an opening of the valve and an increase in the output from the pressure regulator and means for operating on said pilot chamber comprising a solenoid operated valve having a first and second position, a conduit from the pressure tank to the inlet side of the last-mentioned valve, a conduit from the outlet of the last-mentioned valve to the pilot chamber, and a throttled vent attached to the last-mentioned valve, whereby when the solenoid is in its first position, the pressure source and pilot chamber are interconnected, and the throttled vent is closed, and when actuated so as to assume its second position, the pressure source is disconnected from the pilot chamber and the pilot chamber is connected to the throttled vent so as to exhaust therethrough, thereby reducing the pressure in the pilot chamber and increasing the pressure passing the regulator.

2. A system according to claim 1 in which a volume chamber is connected with the pilot chamber to increase the time of venting.

3. A system for introducing a liquid propellant into a motor chamber, said system comprising a source of the propellant, conduit means from the source to the chamber, a valve in the last-mentioned conduit means having a control chamber, a pressure tank, conduit means between the pressure tank and the propellant source, a pressure regulator in the last-mentioned conduit means, said pressure regulator comprising a piston and a valve on the piston, said valve being located in the path of flow through said last-mentioned conduit means, a spring connected with said piston urging the piston in the direction which opens said valve, and a pilot chamber in communication with said piston, the pressure in said pilot chamber urging the piston in the direction which closes said valve, whereby decreasing pressure in the pilot chamber produces an opening of the valve and an increase in the output from the pressure regulator and means for operating on said pilot chamber comprising a solenoid operated valve having a first and second position, a conduit from the pressure tank to the inlet side of the last-mentioned valve, a conduit from the outlet of the last-mentioned valve to the pilot chamber, and a throttled vent attached to the last-mentioned valve, whereby when the solenoid is in its first position, the pressure source and pilot chamber are interconnected, and the throttled vent is closed, and when actuated so as to assume its second position, the pressure source is disconnected from the pilot chamber and the pilot chamber is connected to the throttled vent so as to exhaust therethrough, thereby reducing the pressure in the pilot chamber and increasing the pressure passing the regulator, a second solenoid operated valve located in a conduit at the high pressure side of the pressure tank and conduit means leading from the last-mentioned valve to said control chamber.

References Cited in the file of this patent

UNITED STATES PATENTS

| | | |
|---|---|---|
| 2,397,834 | Bowman | Apr. 2, 1946 |
| 2,398,201 | Young et al. | Apr. 9, 1946 |
| 2,575,677 | Neu | Nov. 20, 1951 |
| 2,601,607 | Halford | June 24, 1952 |
| 2,612,019 | Halford | Sept. 30, 1952 |
| 2,659,197 | Halford et al. | Nov. 17, 1953 |